United States Patent [19]

Lumb et al.

[11] Patent Number: 5,126,182
[45] Date of Patent: Jun. 30, 1992

[54] DRAPABLE, WATER VAPOR PERMEABLE, WIND AND WATER RESISTANT COMPOSITE FABRIC AND METHOD OF MANUFACTURING SAME

[75] Inventors: Douglas Lumb, Methuen; Yechiel Naor, Brookline; Moshe Rock, Andover, all of Mass.

[73] Assignee: Malden Mills Industries, Inc., Lawrence, Mass.

[21] Appl. No.: 468,027

[22] Filed: Jan. 22, 1990

Related U.S. Application Data

[63] Continuation-in-part of Ser. No. 422,850, Oct. 17, 1989.

[51] Int. Cl.⁵ .............. B32B 5/08; B32B 5/22; B32B 5/28; B32B 33/00
[52] U.S. Cl. ...................... 428/90; 156/277; 156/279; 156/327; 156/331.7; 427/206; 427/236; 428/97; 428/246; 428/306.6; 428/308.4; 428/315.9; 428/317.5; 428/317.7; 428/337; 428/339
[58] Field of Search ............ 428/90, 97, 317.5, 317.7, 428/306.6, 308.4, 315.9, 337, 339; 427/206, 336; 051267482/279, 277, 327, 331.7

[56] References Cited

U.S. PATENT DOCUMENTS

| | | | |
|---|---|---|---|
| 3,496,042 | 2/1970 | Wyness | 156/77 |
| 3,642,563 | 2/1972 | Davis et al. | |
| 4,035,532 | 7/1977 | Gregorian et al. | 428/90 |
| 4,056,646 | 11/1977 | Westfall et al. | 428/90 |
| 4,302,500 | 11/1981 | Flora | 428/315.7 |
| 4,308,303 | 12/1981 | Mastroianni et al. | 428/315.9 |
| 4,333,786 | 6/1982 | Civardi et al. | 428/317.5 |
| 4,353,945 | 10/1982 | Samysson | 428/315.5 |
| 4,409,275 | 10/1983 | Samowick | 428/317.5 |
| 4,427,737 | 1/1984 | Cilento et al. | 428/317.5 |
| 4,459,332 | 7/1984 | Giglia | 428/97 |
| 4,539,255 | 9/1985 | Sato et al. | 428/317.5 |
| 4,846,164 | 7/1989 | Martz | 428/90 |
| 4,863,788 | 9/1989 | Bellairs et al. | 428/317.5 |

FOREIGN PATENT DOCUMENTS

| | | |
|---|---|---|
| 1146973 | 3/1969 | United Kingdom |
| 1260462 | 1/1972 | United Kingdom |
| 1321643 | 6/1973 | United Kingdom |

OTHER PUBLICATIONS

*Derwent Japanese Patents Gazette*: C87-122138, (Abstract of Japan 87/199882 Mar. 9, 1987).

*Primary Examiner*—James C. Cannon
*Attorney, Agent, or Firm*—Blum Kaplan

[57] ABSTRACT

A drapable, water vapor permeable, wind and water resistant composite fabric including a fabric substrate, a layer of a foamed water vapor porous adhesive in the surface area of one side of the fabric substrate and a layer or fabric material suitable for exposed use on the other is provided. The fabric material is preferably a layer of flocked fibers. The cellular structure of the foamed adhesive permits water vapor to pass through, however, wind and liquid water is inhibited from passing through the foam barrier. The foamed adhesive is inhibited from penetrating deeply into the fabric substrate during manufacture by an adhesive barrier material on the fabric which may be substantially removed during later processing. The resultant fabric is drapable and particularly suited for use in apparel, replacing two or more single purpose fabric layers within one multi-purpose fabric layer.

69 Claims, 1 Drawing Sheet

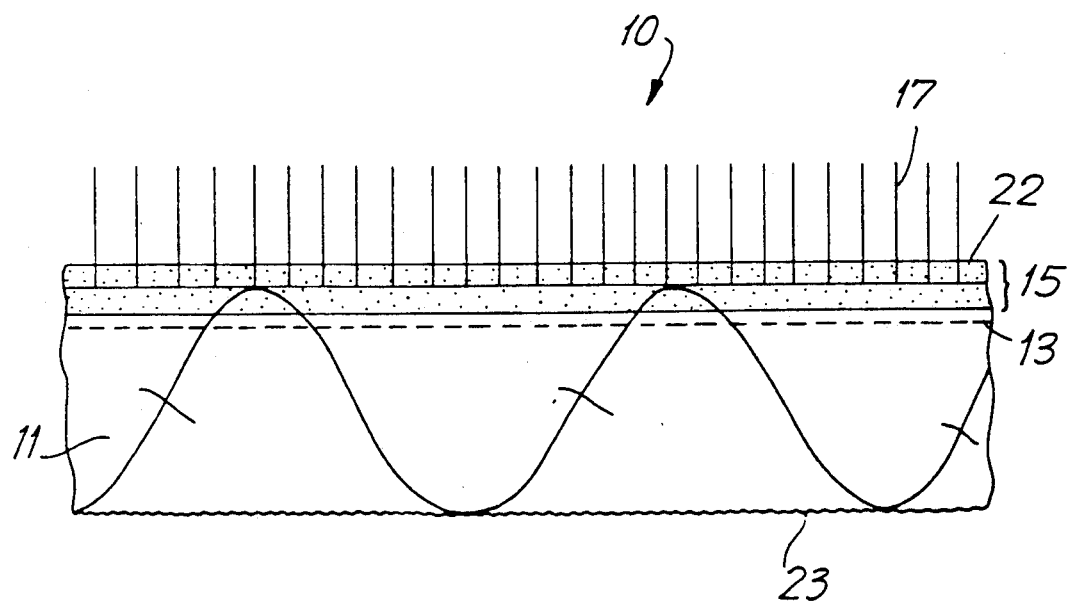

DRAPABLE, WATER VAPOR PERMEABLE, WIND AND WATER RESISTANT COMPOSITE FABRIC AND METHOD OF MANUFACTURING SAME

CROSS-REFERENCE TO RELATED APPLICATION

This application is a continuation-in-part of U.S. patent application Ser. No. 422,850 filed on Oct. 17, 1989 and entitled PRINTED FLOCKED FABRIC.

BACKGROUND OF THE INVENTION

This invention relates generally to a composite fabric and, in particular to a drapable, water vapor permeable, wind and water resistant composite fabric and method of manufacturing same.

While treatments to render fabrics wind and water resistant have been known for many years, it has been difficult to create fabrics which are suitable for apparel use and which are both water vapor permeable and liquid water resistant while being wind resistant. In particular, it has been difficult to create a soft, drapable, breathable, wind and water resistant fabric.

In the past, a rubber layer has been adhered to a fabric substrate to impart waterproof qualities and the exposed surface of the rubber layer was flocked. Foamed adhesives have been used to adhere layers of flock in upholstery fabrics. These fabrics, however, have generally been formed using an open weave Osnaburg fabric as a fabric substrate and do not have the degree of drapability required for apparel fabrics.

U.S. Pat. Nos. 4,308,303 (Mastroianni) and 4,353,945 (Sampson) teach flocked, foam coated, fibrous reinforced, water vapor permeable bacterial barriers for forming surgical drapes and gowns and similar articles. The barriers include a microporous polyolefin film coated with a foamed latex polymer upon which a layer of fibers is flocked. The barriers, however, are not suitable for apparel use since the flock is adhered to a polyolefin film, not a fabric.

Accordingly, it is desirable to provide an improved composite fabric which eliminates these problems associated with prior art fabrics and provides a novel, inexpensive, soft, drapable, water vapor permeable, wind and water resistant composite fabric. It is also desirable to provide a single fabric which performs functions of multiple layers of fabric.

SUMMARY OF THE INVENTION

Generally speaking, in accordance with the invention, a drapable, water vapor permeable, wind and water resistant composite fabric is provided. The composite fabric includes a fabric substrate, a thin layer of foamed adhesive substantially interlocking with the surface region of one side of the fabric substrate and a fabric material having a surface suitable for exterior use interlocking with the foamed adhesive and defining a surface of the composite fabric. The fabric material layer is preferably a layer of flock fibers. The adhesive remains substantially in the surface region of the fabric substrate by reason of a layer of an adhesive barrier material applied to the fabric substrate before the adhesive is applied. An incomplete portion of the adhesive barrier material layer may remain in the composite fabric after finishing. The pores of the foamed adhesive are large enough to allow water vapor molecules to pass through, however, the pores are too small to allow air or liquid water molecules to pass through except under pressure, rendering the fabric wind and water resistant.

The fabric substrate is preferably a fabric suitable for apparel use and preferably a fabric raised on one side, the foamed adhesive being applied to the other (unraised) side of the fabric. The adhesive layer is sufficiently thin and selected to provide drapeability of the finished fabric.

The composite fabric according to the invention is manufactured by applying an adhesive barrier material to the fabric substrate and depositing a layer of foamed adhesive on the adhesive barrier material. A layer of flock fibers or a second layer of fabric is deposited on the adhesive. The adhesive barrier material may be a material which reduces the surface tension of the fabric substrate to a level below that of the adhesive such as a water repellent material. The adhesive barrier material may be substantially removed during later processing of the composite fabric.

Accordingly, it is an object of the invention to provide an improved composite fabric.

A further object of the invention is to provide an improved composite fabric which is water resistant.

A still further object of the invention is to provide a fabric which is liquid water resistant and water vapor permeable.

Another object of the invention is to provide a water resistant composite fabric having drapeability suitable for apparel.

Yet another object of the invention is to provide a composite fabric which is insulative.

Still another object of the invention is to provide a water resistant fabric which is crack resistant at low temperatures.

Yet still another object is to provide a composite fabric which is wind resistant.

Still other objects and advantages of the invention will in part be obvious and will in part be apparent from the specification and drawings.

The invention accordingly comprises the several steps and the relation of one or more of such steps with respect to each of the others, and the article possessing the features, properties, and the relation of elements, which are exemplified in the following detailed disclosure, and the scope of the invention will be indicated in the claims.

BRIEF DESCRIPTION OF THE DRAWING

For a fuller understanding of the invention, reference is had to the following description taken in connection with the accompanying drawing, in which:

The figure is an enlarged sectional schematic view of a composite fabric in accordance with the invention.

DETAILED DESCRIPTION OF THE PREFERRED EMBODIMENTS

Reference is made to the figure wherein a composite fabric, generally indicated at 10, is schematically depicted. Composite fabric 10 includes a fabric substrate 11, and an incomplete layer of an adhesive barrier material 13 deposited on fabric substrate 11. A thin layer of foamed adhesive 15 is deposited in and interlocked with the surface region of the fabric substrate. The remaining portions of a layer of adhesive barrier material 1 is positioned immediately below the adhesive layer which maintains the adhesive in the surface region of the fabric. A layer of flock fibers 17 is deposited on adhesive 15.

Fabric substrate 11 is a knit fabric suitable for exposed use. Preferably, fabric substrate 11 is suitable for apparel. Any plain or textured fabric can be used provided the fabric meets the drapeability standard of the consumer. Fabric substrate 11 is formed of a natural or synthetic fiber or blend thereof including polyester, acrylic, wool, cotton, nylon, etc. In a preferred embodiment, fabric substrate 11 has a raised surface with the flat, technical face or jersey surface 22 of the fabric substrate being flocked and the raised surface 23 being exposed. Such a raised surface fabric provides a garment particularly suited for outerwear because of the warmth of the fabric and the "soft" raised surface against the body. Preferred raised surface fabrics include a terry loop, three-end fleece or two-end fleece construction.

In one embodiment, fabric substrate 11 is a circular weft knit polyester terry loop fabric. The loop yarn may be filament or spun. If the loop yarn is filament, it is between about 70 and 150 denier, preferably 100 denier. If the loop yarn is spun it is between about 24 and 18 singles. The stitch yarn is filament between about 70 and 150 denier, preferably 100 denier. The fabric is between about 0.030 and 0.30 inches thick, preferably 0.070 inches thick. However, this fabric substrate is described by way of example but not by way of limitation. Fabric substrate 11 may be dyed conventionally with, for example, disperse dyes.

An adhesive barrier material 13 is applied to fabric substrate 11. The purpose of the adhesive barrier material is to keep the adhesive material substantially in the surface region of the fabric substrate so that a thin, porous (to the extent required for water vapor permeability (breathability)) and flexible (drapable) layer of adhesive is produced without affecting the adherence of the adhesive. A material which reduces the surface tension of the fabric substrate to a level below that of the adhesive may serve as an adhesive barrier material. A water repellent material performs such a function and may be used with water based adhesives. An aluminum wax is one material suitable for this purpose because it does not itself adversely affect the drapeability characteristic of the final fabric or interfere with the operation of the adhesive, much of the aluminum wax being removed in later processing. The thin surface layer of adhesive performs the desired flock bonding function without rendering the fabric too stiff to serve as an apparel material.

Adhesive barrier material 13 is a water repellent material, and may be an aluminum wax, which may be applied by conventional padding methods during which fabric substrate 11 is dipped in a water based solution which includes the adhesive barrier material. The excess solution is squeezed out when substrate 11 is passed through heavy rollers. The weight of fabric substrate 11 with the adhesive barrier material may be between about 0.5% and 1.3% greater than fabric substrate 11 alone, preferably about 0.9% greater. Preferably, adhesive barrier material 13 is an aluminum wax such as Aridry AA, manufactured by C.N.C. Chemical Co.

Fabric substrate 11, after application of the adhesive barrier material, is dried utilizing conventional drying techniques. Side 23 of fabric substrate 11 is raised by conventional techniques such as by napping and fabric substrate 11 is heat-set.

Adhesive 15 is applied to an unraised side 22 of substrate fabric 11 with a doctor blade or by another application process. Adhesive 15 is a water resistant foamed adhesive, and may be formed from an acrylic latex or acrylic polyurethane, to which may be added an acrylic thickener and ammonia. One example of an adhesive is HYCAR ® 26387 adhesive of The BF Goodrich Company, an acrylic latex. Approximately 1% by weight of an acrylic thickener may be added to the acrylic latex or acrylic polyurethane. The acrylic thickener improves the viscosity of the adhesive under shear. After the thickener is added, approximately 1% by weight of ammonia may be added until the pH of the mixture is approximately 8.5 to control the adhesive viscosity.

The adhesive may be foamed by aeration, for example, by using an Oakes foamer. Any other suitable foaming method, including chemical foaming, may be used. The density of the adhesive is reduced between about 10 and 75 percent, preferably, between about 25 and 50 percent. Foaming increases the porosity and renders the adhesive water vapor permeable, allowing finished fabric 10 to be breathable. The size of the pores in the foam must be large enough to allow water vapor to pass through but small enough to limit liquid water and air from passing through.

In one example, at 50% foam density, a satisfactory water vapor transfer rate of 624 g/m$^2$/24 hrs was obtained using Procedure B (65% humidity) of ASTM E-96. Liquid water transfer occurred at a hydrostatic pressure of 15.1 cm using Method B (Suter) of ASTM D-751 (a measure of relative water resistance). Air flow through the fabric (a measure of relative wind resistance) measured 25.3 ft$^3$/minute/ft$^2$. In another example, at 75% foam density, a satisfactory water vapor transfer rate of 344 g/m$^2$/24 hrs was obtained using Procedure B (65% humidity) of ASTM E-96. Liquid water transfer occurred at a hydrostatic pressure of 25.7 cm using Method B (Suter) of ASTM D-751 (a measure of relative water resistace). Air flow through the fabric (a measure of relative wind resistance) measured 2.56 ft$^3$/minute/ft$^2$. Accordingly, when the foam density is 75%, an extraordinarily wind resistant fabric is produced. A wind resistance, as measured above, of less than about 3.5 ft$^3$/minute/ft$^2$ would be considered highly desirable and achievable by selection of foam density.

When foam density is decreased, and therefore foam porosity increases, the moisture vapor transfer rate increases but the water resistance declines as does the wind resistance. On the other hand, increasing foam density, and therefore decreasing foam porosity, decreases moisture vapor transfer rate, increases water resistance and increases the wind resistance.

When a fabric is used for outerwear, each of these three characteristics plays a role. It is desired to provide a breathable fabric which enables water vapor to pass through the fabric to prevent the trapping of body moisture. The result is greater comfort. It is desired to provide water resistance so that the garment can be used in rainy weather or in snow. The desired goal is to maximize this characteristic without undue sacrifice of the breathability characteristic. It is desired to provide wind resistance so that the garment can be used in windy weather.

The thickness of adhesive 15 is between about 0.35 and 0.65 mm, preferably, the thickness is about 0.50 mm. If the layer of adhesive is too thin, adhesive 15 will not hold the flock fibers and will not form a barrier which is relatively impenetrable by air and liquid water. If adhesive 15 is too thick, composite fabric 10 will lose its breathability and drapeability.

In a preferred embodiment flock fibers 17 are applied to substrate 11 by conventional flocking methods, including electrostatic flocking and mechanical flocking methods. Preferably, flock fibers 17 are attached using an electrostatic flocking method. Flock fibers 17 are formed of nylon, cotton, rayon, acrylic, polyester, wool, a combination of the above or the like. Preferably, flock fibers 17 are 100% nylon. When nylon fibers are used, the fibers may be semi-dull, bright or dull, preferably, the fibers are dull Nylon 6.6. The length of flock fibers 17 is between about 0.5 and 3.0 mm, preferably, 2.1 mm. The size of flock fibers 17 is between about 0.8 and 6.0 denier, preferably about 3.0 denier.

The composite fabric of the invention, however, is not limited to fabrics including a layer of flock on the unraised side of the fabric substrate. Composite fabric 10 may include another form of fabric material layer adhered to adhesive 15 and having a surface suitable for exposed use, without interfering with the breathability, drapeability and wind and water resistant characteristics of the composite fabric.

By printing on the composite fabric or on the fabric substrate and using an essentially transparent adhesive and by various flock on flock techniques, as more particularly taught in U.S. patent application No. 07/422,850, filed Oct. 17, 1989, assigned to the assignee hereof, various decorative effects can be created. However, the use of unflocked regions as taught in some embodiments of the application, would not provide the desired wind and water resistant fabric. The disclosure of U.S. application Ser. No. 07/422,850 is incorporated herein as if fully set forth herein.

Composite fabric 10 undergoes a conventional drying and curing process to dry and cure adhesive 15 and strengthen the chemical bonds which hold flock fibers 17 to fabric substrate 11. Following the drying and curing process, composite fabric 10 is conventionally washed in a jet washing machine with soap and detergents to remove chemicals and loose fibers remaining from the flocking process. A conventional finishing agent may be applied at this time. During the washing process, all or substantially all of the adhesive barrier layer is scoured off the raised surface of the composite fabric.

Composite fabric 10 is conventionally dried. Preferably, drying is accomplished in a tensionless dryer. Composite fabric 10 is refinished to unmat the raised (unflocked) side of the fabric. Finally, composite fabric 10 is tentered to pull it out to width.

The resultant fabric has good drapeability, feel and appearance characteristics making it particularly suited for garments. Further, the fabric provides good breathability (moisture vapor permeability) while providing a satisfactory level of wind and water resistance for the intended applications.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawing shall be interpreted as illustrative and not in a limiting sense It is also to be understood that the following claims are intended to cover all of the generic and specific features of the invention wherein described and all statements of the scope of the invention which, as a matter of language, might be said to fall therebetween.

What is claimed is:

1. A drapable, water vapor permeable, wind and water resistant composite fabric, comprising:
   a fabric substrate;
   a thin layer of at least partially water vapor permeable foamed adhesive applied to a major surface of the fabric substrate interlocked with said major surface of the fabric substrate, said layer of adhesive having been substantially kept from penetrating into the fabric substrate beyond the surface region of the fabric substrate by an adhesive barrier material; and
   a layer of flock fibers or a fabric layer adhered to and covering said adhesive layer.

2. The composite fabric of claim 1, wherein said fabric means comprises a layer of flocked fibers deposited on said layer of adhesive and interlocked therewith.

3. The composite fabric of claim 2, further including at least some of an adhesive barrier material on the fabric substrate adjacent the adhesive.

4. The composite fabric of claim 3, wherein the adhesive barrier material is a material which lowers the surface tension of the fabric substrate below the surface tension of the adhesive.

5. The composite fabric of claim 3, wherein the adhesive barrier material is a water repellent.

6. The composite fabric of claim 3, wherein the adhesive barrier material is an aluminum wax.

7. The composite fabric of claim 2, wherein the fabric substrate is suitable for apparel.

8. The composite fabric of claim 7, wherein the material and thickness of the adhesive layer is selected to be sufficiently flexible to enhance the drapability of the fabric.

9. The composite fabric of claim 2, wherein the fabric substrate is a fabric raised on one side only, the adhesive being on the surface region of the other, unraised side of the fabric substrate.

10. The composite fabric of claim 9, wherein the fabric substrate has a terry loop construction.

11. The composite fabric of claim 9, wherein the fabric substrate has a three-end fleece construction.

12. The composite fabric of claim 9, wherein the fabric substrate has a two-end fleece construction.

13. The composite fabric of claim 2, wherein the fabric substrate is selected from the group consisting of polyester, acrylic, cotton, nylon, wool, rayon or a combination thereof.

14. The composite fabric of claim 13, wherein the fabric substrate is polyester.

15. The composite fabric of claim 2, wherein the fabric substrate is a knit fabric.

16. The composite fabric of claim 2, wherein the fabric substrate is a circular weft knit fabric.

17. The composite fabric of claim 2, wherein the fabric substrate is between about 0.030 and 0.30 inches thick.

18. The composite fabric of claim 17, wherein the fabric substrate is about 0.070 inches thick.

19. The composite fabric of claim 2, wherein the adhesive includes an acrylic latex.

20. The composite fabric of claim 2, wherein the adhesive includes an acrylic polyurethane.

21. The composite fabric of claim 1, wherein the layer of flock fibers or the fabric layer forms a surface suitable for exposed use.

22. The composite fabric of claim 1, wherein the density of the adhesive has been reduced between about 10 and 75 percent by foaming.

23. The composite fabric of claim 1, wherein the density of the adhesive has been reduced about 50 percent by foaming.

24. The composite fabric of claim 1 wherein the density of the adhesive has been reduced about 25 percent by foaming.

25. The composite fabric of claim 2, wherein the density of foam is selected to provide a wind resistant fabric having an air flow less than about 3.5 ft$^3$/minute/ft$^2$.

26. The composite fabric of claim 2, wherein the adhesive layer is between about 0.35 and 0.65 mm thick.

27. The composite fabric of claim 26, wherein the adhesive layer is about 0.50 mm thick.

28. A method of forming a drapable, water vapor permeable, wind and water resistant composite fabric, comprising the steps of:
applying an adhesive barrier material to a fabric substrate in the region of a major surface of the fabric surface;
depositing a layer of foamed adhesive on the major surface of the fabric substrate, the adhesive being substantially prevented from penetrating into the fabric substrate beyond the surface region of the fabric substrate due to the action of the adhesive barrier material and interlocking with said major surface; and
adhering a flock fiber layer or a fabric layer suitable for exposed use to said adhesive layer to define a surface of the composite fabric.

29. The method of claim 28, wherein the layer suitable for exposed use is a plurality of flock fibers.

30. The method of claim 29, wherein the adhesive barrier material is a material which lowers the surface tension of the fabric substrate below the surface tension of the adhesive.

31. The method of claim 29, wherein the adhesive barrier material is a water repellent.

32. The method of claim 29, wherein the adhesive barrier material is an aluminum wax.

33. The method of claim 32, wherein the aluminum wax is applied by padding.

34. The method of claim 33, wherein the fabric substrate is dried before application of the adhesive.

35. The method of claim 34, wherein the fabric substrate is heat set prior to application of the adhesive.

36. The method of claim 29, further including the step of raising the fabric substrate on the surface which is opposed to the major surface.

37. The method of claim 29, further including the step of dyeing the fabric substrate prior to applying the adhesive barrier material.

38. The method of claim 29, further including the step of printing the composite fabric.

39. The method of claim 29, further including the steps of washing and drying the composite fabric.

40. The method of claim 39, wherein the washing step removes a substantial portion of the adhesive barrier material.

41. The method of claim 39, further including the step of finishing the washed and dried composite fabric.

42. The method of claim 29, wherein the fabric substrate is suitable for apparel.

43. The method of claim 29, wherein the material and thickness of the adhesive layer is selected to be sufficiently flexible to enhance the drapability of the fabric.

44. The method of claim 29, wherein the fabric substrate is polyester.

45. The method of claim 29, wherein the fabric substrate is a knit fabric.

46. The method of claim 28, wherein the fabric substrate has a terry loop construction.

47. The method of claim 28, wherein the fabric substrate has a three-end fleece construction.

48. The method of claim 28, wherein the fabric substrate has a two-end fleece construction.

49. The method of claim 29, wherein the fabric substrate is a circular weft knit fabric.

50. The method of claim 29, wherein the fabric substrate is between about 0.03 and 0.30 inches thick.

51. The method of claim 50, wherein the fabric substrate is about 0.07 inches thick.

52. The method of claim 29, wherein the adhesive includes an acrylic latex.

53. The method of claim 29, wherein the adhesive includes an acrylic polyurethane.

54. The method of claim 29, wherein the density of the adhesive is reduced by foaming the adhesive.

55. The method of claim 54, wherein the density of the adhesive is reduced between about 10 and 75 percent.

56. The method of claim 55, wherein the density of the adhesive is reduced about 50 percent.

57. The method of claim 55, wherein the density of the adhesive is reduced about 25 percent.

58. The method of claim 55, wherein the density of foam is selected to provide a wind resistant fabric having an air flow less than about 3.5 ft$^3$/minute/ft$^2$.

59. The method of claim 54, wherein the foaming of the adhesive is by aeration.

60. The method of claim 29, wherein the adhesive layer is between about 0.35 and 0.65 mm thick.

61. The method of claim 54, wherein the adhesive layer is about 0.50 mm thick.

62. The method of claim 29, further including the step of dyeing the composite fabric.

63. The method of claim 42, further including the step of applying water repellant to the washed composite fabric.

64. A drapable, water vapor permeable, wind and water resistant composite fabric formed in accordance with the method of claim 28.

65. A drapable, water vapor permeable, wind and water resistant composite fabric formed in accordance with the method of claim 29.

66. A drapable, water vapor permeable, wind and water resistant composite fabric formed in accordance with the method of claim 30.

67. A drapable, water vapor permeable, wind and water resistant composite fabric formed in accordance with the method of claim 32.

68. A drapable, water vapor permeable, wind and water resistant composite fabric formed in accordance with the method of claim 40.

69. A drapable, water vapor permeable, wind and water resistance composite fabric formed in accordance with the method of claim 54.

* * * * *